Feb. 1, 1938.   J. FINN, JR   2,106,910
CATALYTIC DEVICE
Filed April 16, 1936

INVENTOR
JOHN FINN, JR
BY Charles S. Evans
HIS ATTORNEY

Patented Feb. 1, 1938

2,106,910

UNITED STATES PATENT OFFICE 2,106,910

CATALYTIC DEVICE

John Finn, Jr., Berkeley, Calif., assignor of one-tenth to Phyliss Frohwitter, Berkeley, Calif.

Application April 16, 1936, Serial No. 74,803

8 Claims. (Cl. 23—234)

My invention relates to catalysts, and particularly to a catalytic device for containing and progressively exposing a catalytic agent.

It is among the objects of my invention to provide a catalytic device which will facilitate the use of catalytic materials.

Another object is to provide a catalytic device for automatically exposing fresh particles of catalytic material at intervals while the device is in use.

Another object is to provide a matrix for containing particles of a catalytic agent dispersed therein, the matrix having the property of chipping away under service conditions to expose particles of the catalytic agent over fresh areas thereof.

Another object is to provide a device for use in the treatment of gases, such as the exhaust gases of internal combustion engines, for removing objectional components therefrom, and which may include both catalytic and chemically active substances for affecting such components.

A further object is to provide a catalytic device which may be manufactured economically, and which is highly effective and economical in use.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Figure 1:
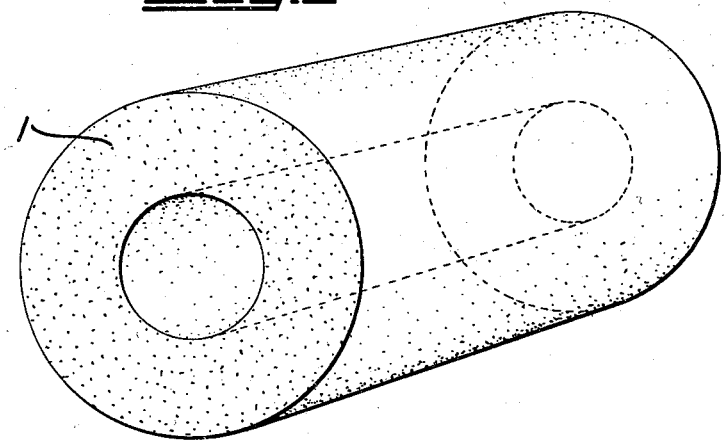
Figure 1 is a view of a catalytic device embodying my invention.
Figure 2:
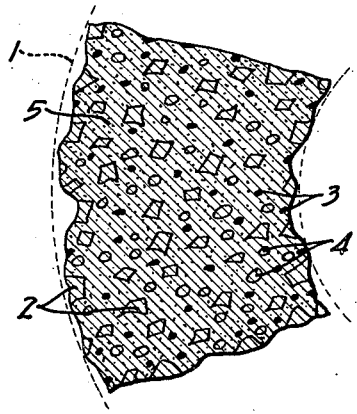
Figure 2 is a magnified fragmental section of a device illustrating the composition, and the surface condition after use.

In terms of broad inclusion, the catalytic device of my invention comprises a catalytic material dispersed in a frangible matrix as for example unannealed glass, slag, or other material in which the internal stresses are such that when a body of the material is subjected to material changes in temperature the surface of the body will chip away and automatically expose underlying particles of the catalytic material, to replace exhausted or partially exhausted particles previously exposed. The matrix may be molded in any desired size and shape to suit the environment in which it is intended for use, and may include particles of chemically active substances to obtain a desired chemical reaction in addition to the catalytic action of the catalytic material.

In terms of greater detail, the catalytic device of my invention comprises a catalytic material of any suitable character adapted to affect a desired reaction of substances brought into contact with the catalytic material. For example, the device of my invention is particularly useful in connection with the treatment of gaseous substances, such as the exhaust gases from internal combustion engines, for effecting the removal therefrom of objectionable components, such as carbon monoxide. In this connection, nickel-copper-cobalt nitrate is an effective catalytic material for bringing about the oxidation of carbon monoxide to carbon dioxide. Other catalytic materials, such as platinum or zinc may be similarly used.

The catalytic material is dispersed in a matrix comprising a frangible material such as unannealed glass, slag or other fused silicious material having high internal stress such that heat, or material changes in temperature, causes a rupture of the material. A satisfactory material for this purpose may be prepared by fusing coal, potash, and borax to make a glass, the fused product being allowed to cool rapidly without annealing. An artificial pumice made by fusing sand, borax and potash and dropping the molten product into water is also suitable. Opal, vermiculite, and similar substances having the property of rupturing when subjected to heat or temperature changes may also be used. Mixtures of two or more substances such as above mentioned may be advantageously used to control the degree of chipping which occurs under ordinary conditions of use. For example, the coal-potash-borax glass, above mentioned breaks down more rapidly when subject to heat, than does pumice. By mixing the two, the rapidity with which the matrix breaks down may be reduced to a desired degree.

The frangible material is ground into fine particles, preferably of a fineness such that they will pass thru a 30 mesh screen and be retained upon a 200 mesh screen, and are mixed with the catalytic material, which is also finely ground, or in solution in water, and a suitable binder such as cement, plaster of Paris, lime or other cementitious material which will set and bind the mixture into a hard body. A satisfactory mixture is as follows:

| | | |
|---|---|---|
| Frangible siliceous material, for example pulverized unannealed glass | pounds | 2½ |
| Gypsum or lime | do | 1 |
| Catalyst | ounces | 0.3 |

Sufficient water is added to the mixture to combine with the gypsum to obtain a fluid mass which may be poured into a mold for hardening. The molds may be of any size or shape, a tubular form being preferred because of the large surface area which such form provides. If desired, the material may be molded on a rigid metallic core which may be secured in a desired position to prevent shifting of the device when in use.

To the above mixture, a chemically active substance, such as copper sulphate, may be added in suitable amount, say about 3¼ ounces in a batch of the size above indicated. The copper sulphate acts as an absorbent for odors; and, when broken down by heat, serves to absorb carbon monoxide, and also acts as a catalyst. Other materials such as nickel chloride, or cuprous chloride, may be substituted for the copper sulphate.

In the drawing, I have illustrated a block 1 of hollow tube like form, in which the frangible siliceous particles are indicated by the rectangles 2. The catalytic material is indicated by the heavy dots 3, and the active chemical reagent by the circles 4; all of the particles are bonded by the cementitious material 5 indicated by light dots.

In use, pieces of the molded material are placed in a passage through which the gases to be treated are passed, as, for example, in the exhaust manifold or the muffler of an internal combustion engine, or the flue of a gas burner.

Particles of catalytic material on the surface of the molded blocks are exposed to the passing stream of gas, and exert a catalyzing action by which carbon monoxide is converted to carbon dioxide. When copper sulphate, or other active reagent, is included, particles of the reagent are similarly exposed on the surface of the block and serve to remove carbon monoxide and other objectionable components of the gases.

The heat of the passing stream of gas causes the pieces of matrix to be heated. This causes the particles of siliceous material to rupture and small areas of the exposed surface of the matrix block scale or chip off from the block so as to expose fresh particles of the catalytic material and active reagent. This scaling or chipping off of the surface continues until gradually the entire body will have been broken down. In the meantime, the scaling or chipping will have caused fresh areas to be periodically exposed so that a substantially continuous supply of fresh catalytic material and active reagent will be uncovered to replace the exhausted, or partially exhausted, particles exposed upon previously exposed areas.

The period of usefulness of the blocks depends upon their composition, and upon the conditions under which they are used. By using a mixture high in the more frangible siliceous material, such as coal-potash-borax slag or glass, the blocks may be caused to break down completely within a few hours. Pumice, used with a gypsum binder, however, breaks down slowly, and when used in the exhaust muffler of an internal combustion engine, a useful life of about 4500 hours of engine operation may be obtained.

Where the nature of the gases treated requires frequent refreshing of the catalytic material, the percentage of highly frangible siliceous material in the matrix is increased to obtain a more rapid scaling of the block.

The scaling of the block is more rapid when the temperature conditions are severe, as for example when the temperature of the passing stream of gas is high, or when changes of temperature occur frequently through a wide range. Under such conditions the proportion of pumice or other siliceous material of relatively low frangibility is increased to retard the rapidity with which the blocks break down.

While I have described my invention primarily in connection with its use for the removal of carbon monoxide from exhaust gases, it is of course equally useful for its catalytic action in other connections. By substituting any of the well-known catalytic materials, the catalytic device of my invention may be readily adapted for use in effecting other reactions in media of various characters where temperature conditions are such as to effect a progressive scaling or breaking down of the matrix body.

I claim:

1. A catalytic device comprising a catalytic material dispersed in a frangible matrix, said matrix containing finely divided particles of an unannealed fused siliceous material and a binder bonding the particles together as a rigid body, the fused siliceous material being present in sufficient amount to cause rupture of the binding material when the silicious particles are ruptured by temperature changes.

2. A catalytic device comprising a mixture of particles of a catalytic material and of an unannealed fused siliceous material, and a binder holding the particles together, the fused siliceous material being present in sufficient amount to cause rupture of the binder over surface portions of the body when the siliceous particles are ruptured by temperature changes in a homogeneous body.

3. A catalytic device comprising finely divided particles of a catalytic material, a powdered frangible material having an internal stress such as to cause rupture of the material when subjected to temperature changes, and a binder holding the frangible material and catalytic material together, the frangible material being present in sufficient amount to cause rupture of the binder over the surface of the body when the body is subjected to temperature changes in a homogeneous body.

4. A catalytic device comprising a homogeneous mixture of catalytic material, powdered unannealed fused siliceous material, copper sulphate, and a binder, the materials being bonded together in a rigid body containing sufficient fused siliceous material to cause surface portions of the body to chip away when subjected to temperature changes.

5. A catalytic device comprising a homogeneous mixture of catalytic material, pulverized unannealed glass, a chemically active reagent for reacting with exhaust gases of internal combustion engines, and a binder holding the materials together, the unannealed glass being present in sufficient amount to cause rupture of surface portions of the binder when subjected to temperature changes.

6. A catalytic device comprising materials mixed and bonded together to form a rigid homogeneous body containing about 0.02 part finely divided catalytic material, 2.50 parts pulverized unannealed glass, and 1.00 part cementitious binder.

7. A catalytic device comprising materials mixed and bonded together to form a rigid homogeneous body containing about 0.02 part finely divided catalytic material for inducing oxidation of carbon monoxide, 2.50 parts pulverized unannealed glass, 1.00 part cementitious binder, and 0.20 part copper sulphate.

8. A catalytic device for treating the exhaust gases of internal combustion engines comprising a rigid homogeneous body shaped for mounting as a unit in the exhaust outlet passage of an internal combustion engine, said body containing particles of a frangible material having an internal stress such as to cause rupture thereof and a gradual scaling away of the surface portions of the body when subjected to temperature changes resulting from operation of the engine, and a catalytic material having the property of inducing oxidation of carbon monoxide, the catalytic material being substantially uniformly distributed throughout the body, fresh particles of the catalytic material being exposed by the scaling away of the body when the device is in service.

JOHN FINN, Jr.